United States Patent
Zhao (10) Patent No.: US 7,956,634 B2
(45) Date of Patent: Jun. 7, 2011

(54) APPARATUS AND METHOD FOR PERFORMING AN ION CONCENTRATION ANALYSIS IN LIQUID CRYSTAL PANEL

(75) Inventor: Haiyu Zhao, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 163 days.

(21) Appl. No.: 12/538,221

(22) Filed: Aug. 10, 2009

(65) Prior Publication Data
US 2010/0033205 A1 Feb. 11, 2010

(30) Foreign Application Priority Data
Aug. 11, 2008 (CN) .......................... 2008 1 0118242

(51) Int. Cl.
*G01R 31/26* (2006.01)
(52) U.S. Cl. .................................... 324/760.01
(58) Field of Classification Search .............. 324/760.01
See application file for complete search history.

(56) References Cited

U.S. PATENT DOCUMENTS
5,734,158 A * 3/1998 Nagashima et al. .......... 250/225
7,545,162 B2 * 6/2009 Chung ..................... 324/760.01
* cited by examiner Primary Examiner — Ha Tran T Nguyen
Assistant Examiner — Tung X Nguyen
(74) Attorney, Agent, or Firm — Ladas & Parry LLP (57) ABSTRACT

The present invention provides an apparatus and method for performing an ion concentration analysis in an LCD panel. The method comprises: adjusting common voltage of an LCD panel to be tested and a standard LCD panel, respectively, and obtaining a first common voltage of the LCD panel to be tested and a first common voltage of the standard LCD panel; adjusting the first common voltage of the standard LCD panel and the first common voltage of the LCD panel to be tested, respectively, according to a predetermined testing voltage; loading a first image to the standard LCD panel and the LCD panel to be tested, respectively, and maintaining the first image in the standard LCD panel and the LCD panel to be tested for a period of time; switching the loaded first image to a second image; and analyzing ion concentration in the LCD panel to be tested on the basis of image sticking levels appearing in the standard LCD panel and the LCD panel to be tested.

10 Claims, 5 Drawing Sheets

APPARATUS AND METHOD FOR PERFORMING AN ION CONCENTRATION ANALYSIS IN LIQUID CRYSTAL PANEL

BACKGROUND OF THE INVENTION

Embodiments of the present invention generally relate to an apparatus and method for performing an ion concentration analysis in a liquid crystal display (LCD) panel.

With the continuous advancements in technology, liquid crystal display (LCD) devices, which have advantages of smaller volume, lighter weight, lower power consumption and lower radiation, have been replacing cathode-ray tube (CRT) devices in the market and been widely used in television sets and computer display applications. LCD devices can generally be classified into three types, i.e., the thin film transistor (TFT) type, the twisted nematic (TN) type, and the super twisted nematic (STN) type. As one of main parts of a LCD device, a liquid crystal display panel comprises a color filter substrate, a thin film transistor (TFT) array substrate, a liquid crystal layer sealed between the two substrates, a sealant member, alignment layers and etc.

Concentration of ions contained in an LCD panel is critical to the electrical characteristics of the LCD panel. Ion concentration affects performance of the LCD panel in various aspects, such as voltage remaining level, threshold voltage value, flicker, image sticking and the like. For this reason, ion concentration needs to be controlled during manufacture of the LCD device. For example, in the liquid crystal layer of a TN-type LCD device, the concentration of cathode and anode ions should meet the specification that the highest concentration of anode ions is no more than 0.5 ppm and the highest concentration of cathode ions is no more than 100 ppm.

Conventionally, ion concentration is detected through chemical analysis methods such as ion chromatography. Chemical analysis methods can be employed to compare ion concentrations in two LCD panels and determine which alignment layer may introduce ions more easily according to the comparing result. Ion concentration detection by chemical analysis can advantageously determine composition of the ions and obtain concentration value of each kind of ions. The chemical analysis method is effective in ion concentration analysis and microscopic analysis, but it still has disadvantages. In conceiving the present invention, the inventor found the chemical analysis has at least following disadvantages.

(1) The LCD panel subject to analysis must be disassembled to perform the chemical analysis, thus the LCD panel cannot operate or undergo other analyses any more.

(2) The chemical analysis method usually takes a long time.

(3) Since many ions are absorbed on surface of the alignment layer in the LCD device, the chemical analysis, which mainly detects ion contents in the liquid crystal layer, can only involves a part of ions in the LCD panel.

(4) The chemical analysis method cannot obtain the total ion content in the LCD panel directly, it can only analyses ion concentration in term of one of the liquid crystal layer, the alignment layer, the sealant and the manufacture process, respectively, and it is difficult to integrate the analysis results.

SUMMARY OF THE INVENTION

An embodiment of the present invention provides a method for performing an ion concentration analysis in an LCD panel, comprising: adjusting common voltage of the LCD panel to be tested and a standard LCD panel, respectively, and obtaining a first common voltage of the LCD panel to be tested and a first common voltage of the standard LCD panel; adjusting the first common voltage of the standard LCD panel and the first common voltage of the LCD panel to be tested, respectively, according to a predetermined testing voltage; loading a first image to the standard LCD panel and the LCD panel to be tested and maintaining the first image in the standard LCD panel and the LCD panel to be tested for a period of time; switching the loaded first image to a second image; and analyzing ion concentration in the LCD panel to be tested on the basis of image sticking levels in the standard LCD panel and in the LCD panel to be tested.

An embodiment of the present invention further provides an apparatus for performing an ion concentration analysis in an LCD panel, composing: an adjusting module for adjusting common voltages of a standard LCD panel and the LCD panel to be tested, respectively, so as to obtain a first common voltage of the standard LCD panel and a first common voltage of the LCD panel to be tested, and adjusting the first common voltage of the standard LCD panel and the LCD panel to be tested according to a predetermined testing voltage, respectively; and a loading module for loading a first image to the standard LCD panel and the LCD panel to be tested, respectively, maintain the first image in the standard LCD panel and the LCD panel to be tested for a period of time, and switching the loaded first image to a second image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

The invention will be described more fully hereinafter with reference to the accompanying drawings, in which the embodiments of the invention are shown.

Figure 1:
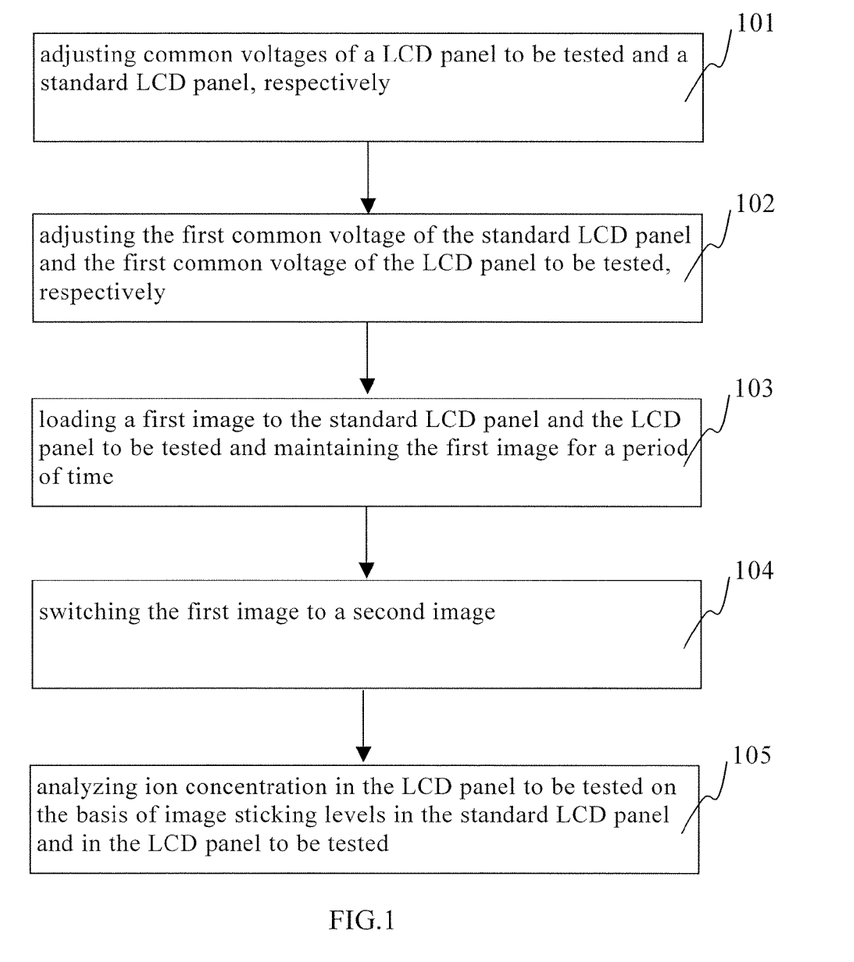
FIG. 1 is a flow chart showing a method for performing an ion concentration analysis in an LCD panel according to an exemplary embodiment of the present invention.

FIG. 1 is a flow chart showing a method for performing an ion concentration analysis in an LCD panel according to an exemplary embodiment of the present invention. As shown in FIG. 1, the present embodiment provides a method for performing an ion concentration analysis in an LCD panel comprising following steps.

Step 101 of adjusting common voltages of a LCD panel to be tested and a standard LCD panel, respectively, and obtaining a first common voltage of the LCD panel to be tested and a first common voltage of the standard LCD panel.

When performing an ion concentration analysis in an LCD panel to be tested, a standard LCD panel, in which ion concentrations meet the standard specification in the LCD panel field, is needed. For example, in a liquid crystal layer of a TN-type LCD device, the highest concentration of anode ions is no more than 0.5 ppm, and the highest concentration of cathode ions is no more than 100 ppm. Further, the standard LCD panel has the same rubbing direction as that of the LCD panel to be tested. If the rubbing direction is different between the standard LCD panel and the LCD panel to be tested, the analysis of ion concentration will be affected. In addition, some specifications and parameters of the standard LCD panel are also in conformity with that of the LCD panel to be tested, such as model of the panels, materials used therein, or the like. Only when the selected standard LCD panel has parameters the same as or similar to those of the LCD panel to be tested, results of the following comparison analysis can be effective.

The step 101 may comprises: adjusting common voltages of the LCD panel to be tested and the standard LCD panel, respectively, and herein the common voltage refers to the voltage applied on the common electrode of the LCD panel. As a result, a first common voltage of the LCD panel to be tested is obtained as $V_{comA}$ and a first common voltage of the standard LCD panel is obtained as $V_{comB}$.

In the step 101, adjusting common voltages of the LCD panel to be tested and the standard LCD panel may comprise: setting common voltage of the LCD panel to be tested and that of the standard LCD panel such that the voltage of direct current (DC) component (Vdc) of driving voltage of each of the two LCD panels is equal to zero voltage. In other words, both flicker in a central portion of the standard LCD panel and flicker in a central portion of the LCD panel to be tested are adjusted to the minimum degree.

Step 102 of adjusting the first common voltage of the standard LCD panel and the first common voltage of the LCD panel to be tested, respectively, according to a selected testing voltage.

The step 102 may comprise: selecting a testing voltage; adjusting the first common voltage of the LCD panel to be tested to a second common voltage of the LCD panel to be tested, which is substantially equal to a sum of the first common voltage and the testing voltage of the LCD panel to be tested; and adjusting the first common voltage of the standard LCD panel to a second common voltage of the standard LCD panel, which is substantially equal to a sum of the first common voltage and the testing voltage of the standard LCD panel. The first common voltage and the second voltage are the common voltages of the standard LCD panel and the LCD panel to be tested at different times, and both of them refer to the same physical parameter as the common voltage in the step 101. The step 102 may be performed as follows. First, a testing voltage is selected. The testing voltage is in a range of 0.05-1.00V. The higher the testing voltage is, the shorter the period for subsequent estimation on image sticking test is. Such range for testing voltage is an optimized range obtained through experiments.

Reason for setting 0.05V as a lower limit is as follows. For a typical panel, the common voltage does not necessarily ensure a DC component of 0V, but the DC component is maintained below 0.05V, for example, −0.03V. The common voltage is set at 0.05V in order that an actual DC component is about 0.02V after the common voltage is adjusted by +0.05V. Reason for setting 1.00V as an upper limit is as follows. The higher the selected testing voltage is, the shorter the period required for subsequent estimation on image sticking test is. However, experiments show that, when the selected testing voltage is too high, image quality of the LCD panel is deteriorated remarkably.

In addition, after selection of the testing voltage, the first common voltage of the LCD panel to be tested is adjusted to the second common voltage of the LCD panel to be tested, which is substantially equal to the sum of the first common voltage of the LCD panel to be tested and the testing voltage, that is, the common voltage of the LCD panel to be tested now is $V_{comA}+V1$, where $V_{comA}$ is the first common voltage of the LCD panel to be tested; and the first common voltage of the standard LCD panel is adjusted to the second common voltage of the standard LCD panel, which is substantially equal to the sum of the first common voltage of the standard LCD panel and the testing voltage, that is, the common voltage of the standard LCD panel is now $V_{comB}+V1$, where $V_{comB}$ is the first common voltage of the standard LCD panel. At this point, the standard LCD panel and the LCD panel to be tested each have a DC voltage component of −2×V1. Taking square wave as an example, if high and low voltages $V_{high}$ and $V_{low}$ are 10V and 0V, respectively, and $V_{com}$ is 4V, the DC voltage would be $V_{high}-V_{com}-(V_{com}-V_{low})=V_{high}+V_{low}-2V_{com}=10+0-2\times4=2V$. Thus, when $V_{com}$ is changed by V1, the DC voltage component is changed by −2×V1.

Step 103 of loading a first image to the standard LCD panel and the LCD panel to be tested and maintaining the first image for a period of time.

Preferably, a first image is selected and simultaneously loaded to the standard LCD panel and the LCD panel to be tested. That is, the standard LCD panel and the LCD panel to be tested are loaded with the same first image. Preferably, the first image may be a chessboard white-black pattern, i.e., an image consisting of black rectangles with a gray scale of 0 and white rectangles with a gray scale of 255 that are arraigned in a matrix.

Figure 2:
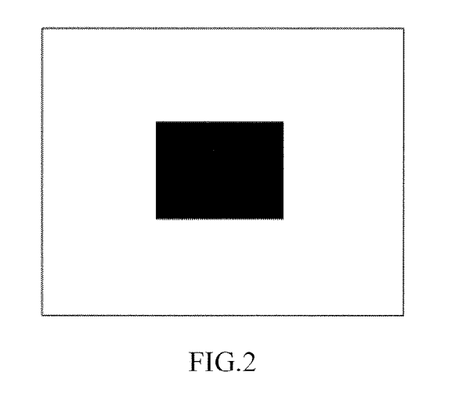
FIG. 2 is a schematic view showing a chessboard white-black pattern in an embodiment of an ion concentration analysis method according to the present invention.
Figure 3:
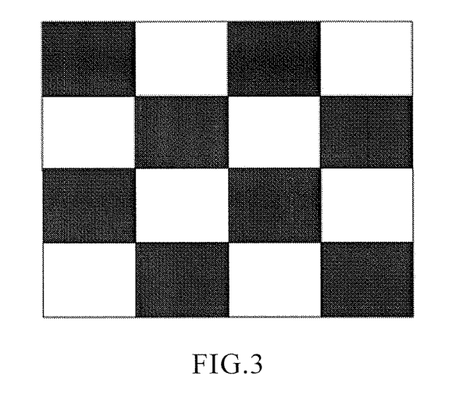
FIG. 3 is another schematic view showing a chessboard white-black pattern in an embodiment of an ion concentration analysis method according to the present invention.

FIG. 2 is a schematic view showing a chessboard white-black pattern in an ion concentration analysis method according to an embodiment of the present invention; and FIG. 3 is another schematic view showing a chessboard white-black pattern in an ion concentration analysis method according to another embodiment of the present invention. After loading the first image to the standard LCD panel and the LCD panel to be tested, the first image is maintained for a period of time, for example, 10 minutes~24 hours. This period of time depends on the selected testing voltage. The higher the testing voltage is, the shorter the period of time is.

Step 104 of switching the first image to a second image.

Figure 4:
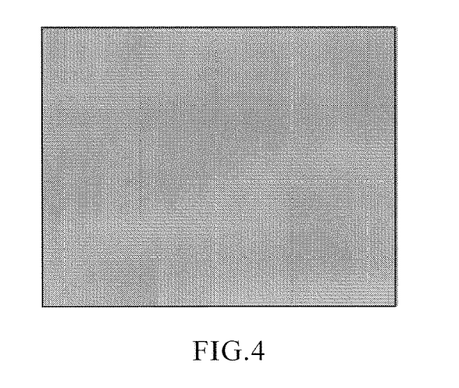
FIG. 4 is a schematic view showing an ideal result, with respect to the chessboard white-black pattern shown in FIG. 3, of an embodiment of an ion concentration analysis method according to the present invention.
Figure 5:
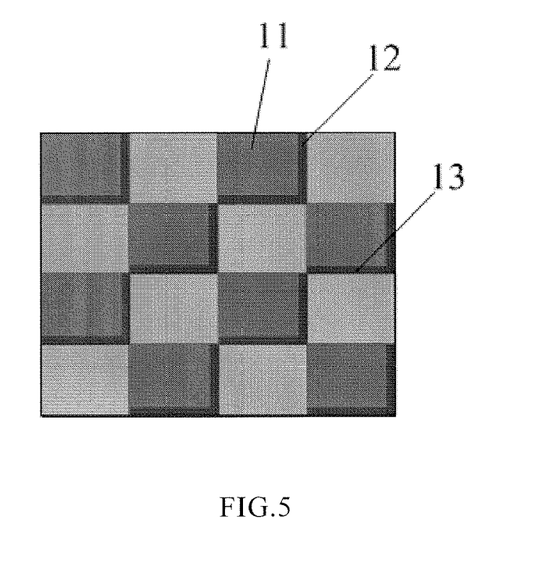
FIG. 5 is a schematic view showing an actual result, with respect to the chessboard white-black pattern shown in FIG. 3, of an embodiment of an ion concentration analysis method according to the present invention.

The first image loaded to the standard LCD panel and the LCD panel to be tested is switched to a second image. The second image may be an image that makes the standard LCD panel and the LCD panel to be tested display in the same gray scale. Preferably, the second image may be an image with a gray scale of 127. Image sticking occurs when an LCD panel is under an electric field for a long time. Typically, image sticking can be line image sticking or area image sticking. FIG. 4 is a schematic view showing an ideal result, with respect to the chessboard white-black pattern shown in FIG. 3, of an ion concentration analysis method according to an embodiment of the present invention. When switching from the image shown in FIG. 3 to the image shown in FIG. 4, the LCD panel in theory should ideally display the image shown in FIG. 4, but actually not. Displayed on the LCD panel is an image of FIG. 5. FIG. 5 is a schematic view showing an actual result, with respect to the chessboard white-black pattern shown in FIG. 3, of an ion concentration analysis method according to an embodiment of the present invention. Referring to FIG. 5, area image sticking 11 and line image sticking comprising vertical line image sticking 12 and horizontal line image sticking 13 are shown.

Figure 6:
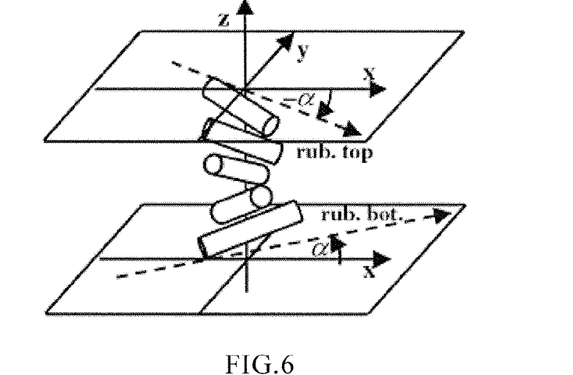
FIG. 6 is a schematic view showing a coordinate relationship in an embodiment of an ion concentration analysis method according to the present invention.

Image sticking is generated due to transverse movement of ions. FIG. 6 is a schematic view showing a coordinate relationship in an ion concentration analysis method according to an embodiment of the present invention. Referring to FIG. 6, there is shown a STN type LCD panel as an example. The symbols "x" and "y" each represent a direction in the plane of the panel, "z" represents a direction perpendicular to the plane of the panel, "α" represents an angle between the x axis and the rubbing direction of the lower substrate (rub.bot), and "−α" represents an angle between the x axis and the rubbing direction of the upper substrate (rub.top). Transverse movement of ions occurs due to different mobility of ions in the axial direction $\mu_p$ and in a direction perpendicular to the axial direction $\mu_\perp$. The following equation (1) gives moving speed of ions in x, y and z directions:

$$v(z,t) = \begin{pmatrix} v_x \\ v_y \\ v_z \end{pmatrix} = \begin{pmatrix} \Delta\mu\sin\theta\cos\theta\cos\varphi \\ \Delta\mu\sin\theta\cos\theta\sin\varphi \\ \mu_p\sin^2\theta + \mu_\perp\cos^2\theta \end{pmatrix} \times \left( \pm E(z,t) - \frac{kT}{e}\frac{1}{n(z,t)}\frac{\partial n(z,t)}{\partial z} \right), \quad (1)$$

wherein $\Delta\mu = \mu_p - \mu_\perp$, θ represents a tilt angle of the liquid crystal molecules, φ represents a twisted angle of the liquid crystal molecules, E represents strength of electric field, n represents ion concentration, and t represents temperature. In addition, $v_x$, which is in proportion to the square of ion concentration, may lead to vertical line image sticking, and $v_y$, which is in proportion to n×Vdc, may lead to horizontal line image sticking.

Step 105 of analyzing ion concentration in the LCD panel to be tested on the basis of image sticking levels in the standard LCD panel and in the LCD panel to be tested.

With above preparation, ion concentration of the LCD panel to be tested now can be analyzed. Specifically, when the image inputted into the standard LCD panel and the LCD panel to be tested is switched to the image with a gray scale of 127, image sticking of different level can be observed from the images displayed on the standard LCD panel and the LCD panel to be tested, respectively. Ion concentration of the LCD panel to be tested can be analyzed by comparing the image sticking level of the LCD panel to be tested with the image sticking level of the standard LCD panel.

Figure 7:
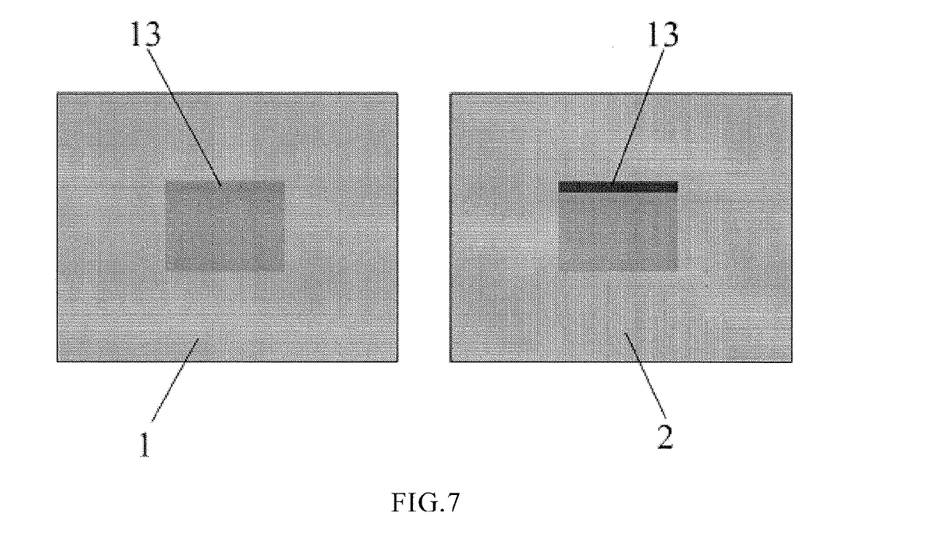
FIG. 7 is a schematic view showing an actual result, with respect to the chessboard white-black pattern shown in FIG. 2, of an embodiment of an ion concentration analysis method according to the present invention.

Preferably, the step 105 of analyzing ion concentration in the LCD panel to be tested may be as follows. If the image sticking level of the LCD panel to be tested is stronger than that of the standard LCD panel, ion concentration of the LCD panel to be tested is higher than that of the standard LCD panel; and if the image sticking level of the LCD panel to be tested is weaker than that of the standard LCD panel, ion concentration of the LCD panel to be tested is lower than that of the standard LCD panel. By comparison analysis, if the line image sticking level of the LCD panel to be tested is stronger than that of the standard LCD panel, it can be determined that ion concentration of the LCD panel to be tested is higher than that of the standard LCD panel; if the line image sticking level of the LCD panel to be tested is weaker than that of the standard LCD panel, it can be determined that ion concentration of the LCD panel to be tested is lower than that of the standard LCD panel. FIG. 7 is a schematic view showing an actual result, with respect to the chessboard white-black pattern shown in FIG. 2, of an ion concentration analysis method according to an embodiment of the present invention. As shown in FIG. 7, the horizontal image sticking 13 of the LCD panel to be tested 2 is much stronger than that of the standard LCD panel, which indicate that ion concentration of the LCD panel to be tested 2 is higher than that of the standard LCD panel 1.

In conceiving the present invention, the inventor conducted a series of experiments on ion concentration with the above analysis method. Details of the experiments are described as follows.

Figure 8:
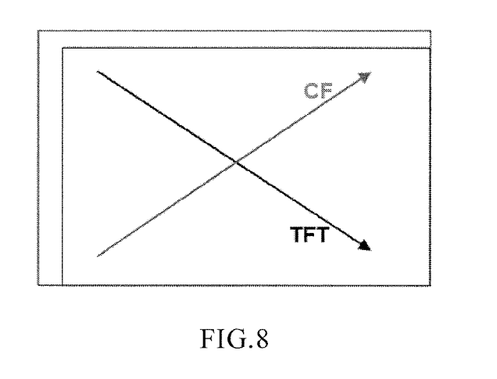
FIG. 8 is a schematic view showing rubbing directions in Experiment 1 in accordance with an embodiment of an ion concentration analysis method of the present invention.
Figure 9:
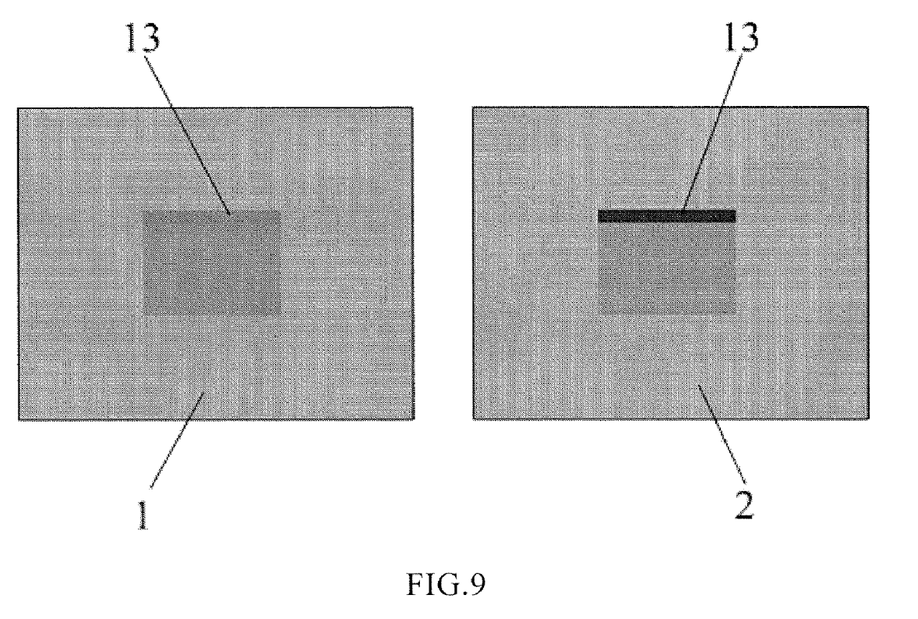
FIG. 9 is a schematic view showing the result of Experiment 1.

Experiment 1. The standard LCD panel and the LCD panel to be tested both are of a TN type and have the same rubbing direction. FIG. 8 is a schematic view showing rubbing directions in Experiment 1 of an ion concentration analysis method in accordance with an embodiment of the present invention, and the arrows in the figure represent rubbing directions of the color filter (CF) substrate and the thin film transistor (TFT) array substrate. In Experiment 1, difference between the standard LCD panel and the LCD panel to be tested lies in the material of the alignment layer. Assume that material for forming the alignment layers of the standard LCD panel is different from that for the LCD panel to be tested, and other conditions are completely the same. In the present experiment, the testing voltage is 0.5V, and the period of time for estimation on image sticking test is 2 hours. FIG. 9 is a schematic view showing the result of Experiment 1. As shown in FIG. 9, the horizontal image sticking 13 of the standard LCD panel 1 is very weak, whereas the LCD to be tested 2 exhibits obvious horizontal image sticking 13. The result shows ions may be introduced more likely from the material PIB than the material PIA.

Figure 10:
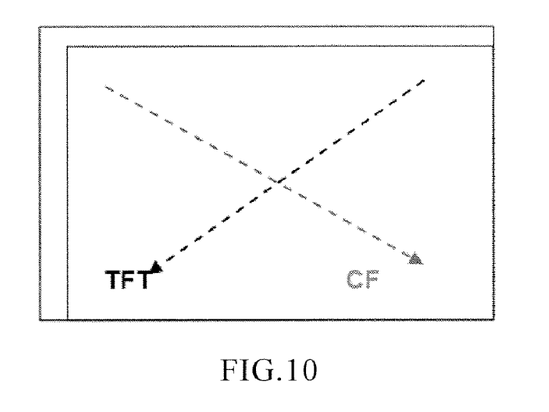
FIG. 10 is a schematic view showing rubbing directions in Experiment 2 in accordance with an embodiment of an ion concentration analysis method of the present invention.
Figure 11:
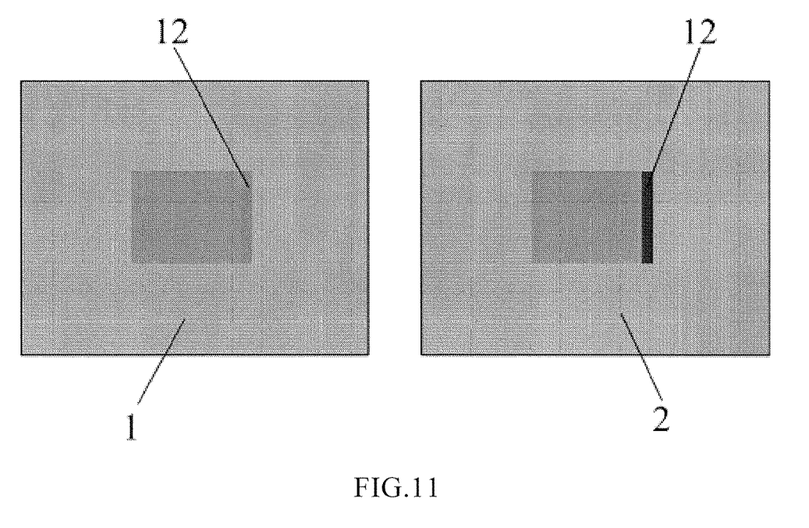
FIG. 11 is a schematic view showing the result of Experiment 2.

Experiment 2. The present experiment is substantially the same as Experiment 1 except the rubbing direction. FIG. 10 is a schematic view showing rubbing directions in Experiment 2 of an ion concentration analysis method in accordance with an embodiment of the present invention, and FIG. 11 is a schematic view showing the result of Experiment 2. As shown in FIG. 11, the vertical image sticking 12 of the standard LCD panel 1 is very weak, whereas the LCD to be tested 2 exhibits obvious vertical image sticking 12. The result shows ions may be introduced more likely from the material PIB than the material PIA. The result also shows due to change in rubbing direction, the vertical image sticking 12 appears while horizontal image sticking 13 disappears.

Figure 12:
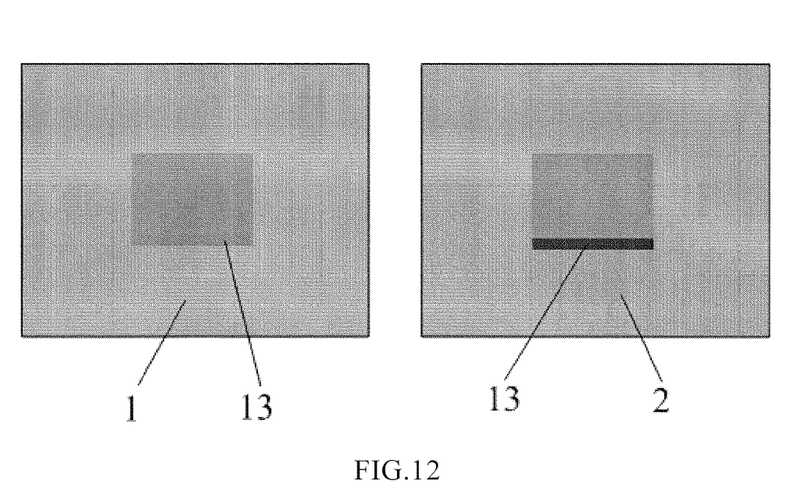
FIG. 12 is a schematic view showing the result of Experiment 3 in accordance with an embodiment of an ion concentration analysis method of the present invention.

Experiment 3. The present experiment is substantially the same as Experiment 1 except that the testing voltage is changed from 0.5V to −0.5V. FIG. 12 is a schematic view showing the result of Experiment 3 of an ion concentration analysis method in accordance with an embodiment of the present invention. As shown in FIG. 12, the horizontal image sticking 13 of the standard LCD panel 1 is very weak, whereas the LCD to be tested 2 exhibits obvious horizontal image sticking 13. The result shows ions may be introduced more likely from the material PIB than the material PIA. The result also shows due to reverse of direction of the external applied DC voltage caused by change of the testing voltage, the position of the horizontal image sticking 13 varies.

It can be seen from above Experiments 1-3 that compared with the conventional chemical analysis method, the method according to the embodiment of the present invention for ion concentration analysis in an LCD panel can reflect relative ion concentration more intuitively. The method according to the embodiment may be applied to estimate materials such as liquid crystal, material for an alignment layer, and material for a sealant. Further, the method of the present invention may indicate a total ion concentration in the LCD panel, whereas the conventional chemical analysis method can only detect ion concentration in term of one of the liquid crystal layer, the alignment layer, the sealant and the manufacture process, respectively, and further it is difficult to integrate respective analysis results.

As above, the method for performing an ion concentration analysis in an LCD panel according to the embodiment is conducted by comparing image sticking levels of a LCD panel to be tested and a standard LCD panel. The method enables ion concentration analysis without disassembling the LCD panel, avoiding damage to the LCD panel and shortening time required for the ion concentration analysis.

Figure 13:
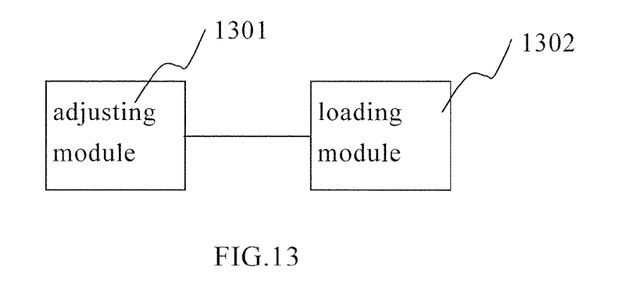
FIG. 13 is a block diagram showing an embodiment of an apparatus for performing an ion concentration analysis in an LCD panel.

FIG. 13 is a block diagram showing an apparatus for performing an ion concentration analysis in an LCD panel according to an embodiment. Referring to FIG. 13, the apparatus comprises an adjusting module 1301 and a loading module 1302. The adjusting module 1301 serves to adjust common voltage of a standard LCD panel and a LCD panel to be tested, respectively, so as to obtain a first common voltage of the standard LCD panel and a first common voltage of the LCD panel to be tested, and adjust the first common voltage of the standard LCD panel and the LCD panel to be tested based on a selected testing voltage, respectively. The loading module 1302 serves to load a first image to the standard LCD panel and the LCD panel to be tested, respectively, maintain the first image in the standard LCD panel and the LCD panel to be tested for a period of time, and switch the loaded first image to a second image. The modules 1301 and 1301 can be implemented in the form of software, firmware, hardware, or the like.

After the adjusting module 1301 adjusts the common voltage of the LCD panel to be tested and the standard LCD panel to obtain the second common voltage, the loading module 1302 loads the first image to the LCD panel to be tested and the standard LCD panel, respectively. Preferably, the first image may be a chessboard white-black pattern. After loaded in the LCD panel to be tested and the standard LCD panel, the first image is maintained for a period of time, such as 10 minutes to 24 hours. The period of time may be determined with reference to the selected testing voltage. Then, the first image loaded to the LCD panel to be tested and the standard LCD panel is switched by the loading module 1302 to the second image. Preferably, the second image is an image with the gray scale of 127. After the image with the gray scale of 127 is loaded to the LCD panel to be tested and the standard LCD panel, image sticking may be observed in the image displayed on each of the two panels. Ion concentration in the LCD to be tested can be analyzed through the comparison between the image sticking levels of the LCD panel to be tested and the standard LCD panel. If the image sticking level of the LCD panel to be tested is stronger than that of the standard LCD panel, the LCD panel to be tested has ion concentration higher than that of the standard LCD panel; if the image sticking level of the LCD panel to be tested is weaker than that of the standard LCD panel, the LCD panel to be tested has ion concentration lower than that of the standard LCD panel.

The present invention provides an apparatus for performing an ion concentration analysis in an LCD panel by comparing image sticking levels of a LCD panel to be tested and a standard LCD panel. The inventive apparatus enables ion concentration analysis without disassembling the LCD panel, avoiding damage to the LCD panel and shortening time required for the ion concentration analysis.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A method for performing an ion concentration analysis in an LCD panel, comprising:
    adjusting common voltage of an LCD panel to be tested and a standard LCD panel, respectively, and obtaining a first common voltage of the LCD panel to be tested and a first common voltage of the standard LCD panel;
    adjusting the first common voltage of the standard LCD panel and the first common voltage of the LCD panel to be tested, respectively, according to a predetermined testing voltage;
    loading a first image to the standard LCD panel and the LCD panel to be tested, respectively, and maintaining the first image in the standard LCD panel and the LCD panel to be tested for a period of time;
    switching the loaded first image to a second image; and
    analyzing ion concentration in the LCD panel to be tested on the basis of image sticking levels appearing in the standard LCD panel and the LCD panel to be tested.

2. The method of claims 1, wherein the LCD panel to be tested and the standard LCD panel have the same rubbing direction.

3. The method of claim 1, wherein adjusting common voltage of the LCD panel to be tested and the standard LCD panel, respectively, comprises adjusting common voltage of the LCD panel to be tested and the standard LCD panel, respectively, so that direct current (DC) voltage component in each of the LCD panel to be tested and the standard LCD panel is equal to zero.

4. The method of claims 3, wherein the LCD panel to be tested and the standard LCD panel have the same rubbing direction.

5. The method of claim 4, wherein adjusting the first common voltage of the standard LCD panel and the first common voltage of the LCD panel to be tested, respectively, according to a predetermined testing voltage comprises:
selecting a testing voltage;
adjusting the first common voltage of the LCD panel to be tested to a second common voltage of the LCD panel to be tested that is a sum of the first common voltage of the LCD panel to be tested and the testing voltage; and
adjusting the first common voltage of the standard LCD panel to a second common voltage of the standard LCD panel that is a sum of the first common voltage of the standard LCD panel and the testing voltage.

6. The method of claim 5, wherein the first image is a chessboard white-black pattern, and, wherein the second image is an image that makes the standard LCD panel and the LCD panel to be tested display in the same gray scale.

7. The method of claim 5, wherein the testing voltage is in a range of about 0.05-1.00V.

8. The method of claim 1, wherein maintaining the first image in the standard LCD panel and the LCD panel to be tested for a period of time comprises maintaining the first image in the standard LCD panel and the LCD panel to be tested for about 10 minutes to 24 hours.

9. The method of claim 1, wherein analyzing ion concentration in the LCD panel to be tested on the basis of image sticking levels appearing in the standard LCD panel and the LCD panel to be tested comprises:
if the image sticking level of the LCD panel to be tested is stronger than that of the standard LCD panel, ion concentration of the LCD panel to be tested is higher than that of the standard LCD panel; and
if the image sticking level of the LCD panel to be tested is weaker than that of the standard LCD panel, ion concentration of the LCD panel to be tested is lower than that of the standard LCD panel.

10. An apparatus for performing an ion concentration analysis in an LCD panel, comprising:
an adjusting module for adjusting common voltages of a standard LCD panel and an LCD panel to be tested, respectively, so as to obtain a first common voltage of the standard LCD panel and a first common voltage of the LCD panel to be tested, and adjusting the first common voltage of the standard LCD panel and the LCD panel to be tested according to a predetermined testing voltage, respectively; and
a loading module for loading a first image to the standard LCD panel and the LCD panel to be tested, respectively, maintain the first image in the standard LCD panel and the LCD panel to be tested for a period of time, and switching the loaded first image to a second image.

\* \* \* \* \*